(12) United States Patent
Roelleke

(10) Patent No.: US 7,584,036 B2
(45) Date of Patent: Sep. 1, 2009

(54) DEVICE FOR ACTIVATING PERSONAL PROTECTION MEANS

(75) Inventor: Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 517 days.

(21) Appl. No.: 10/582,181

(22) PCT Filed: Jul. 22, 2004

(86) PCT No.: PCT/DE2004/001606

§ 371 (c)(1),
(2), (4) Date: Jun. 8, 2006

(87) PCT Pub. No.: WO2005/056345

PCT Pub. Date: Jun. 23, 2005

(65) Prior Publication Data

US 2007/0124047 A1    May 31, 2007

(30) Foreign Application Priority Data

Dec. 9, 2003  (DE) ............................ 103 57 352

(51) Int. Cl.
B60R 22/00   (2006.01)

(52) U.S. Cl. ....................... 701/45; 280/734

(58) Field of Classification Search ............ 701/45–47; 180/268, 271, 282; 280/734, 735; 307/9.1, 307/10.1
See application file for complete search history.

(56) References Cited

U.S. PATENT DOCUMENTS

| 6,196,580 | B1 * | 3/2001 | Eberle et al. ................. 280/735 |
| 6,300,866 | B1 * | 10/2001 | Foith et al. .................. 340/436 |
| 6,648,367 | B2 * | 11/2003 | Breed et al. .............. 280/730.1 |
| 7,213,670 | B2 * | 5/2007 | Iyoda et al. .................. 180/282 |
| 2003/0156750 | A1 | 8/2003 | Dajee et al. |

FOREIGN PATENT DOCUMENTS

| DE | 41 06 079 | 9/1992 |
| DE | 197 45 309 | 4/1999 |
| DE | 199 00 327 | 7/2000 |
| DE | 199 63 348 | 7/2001 |
| DE | 100 33 907 | 1/2002 |
| DE | 101 47 732 | 5/2003 |
| WO | WO 01/47750 | 7/2001 |

* cited by examiner

Primary Examiner—Dalena Tran
(74) Attorney, Agent, or Firm—Kenyon & Kenyon LLP

(57) ABSTRACT

A device for activating personal protection devices activates the personal protection devices as a function of a delay between a first signal from an impact sensor system situated in the vehicle front and a second signal from a centrally located acceleration sensor system, the first and second signals each identifying an impact.

10 Claims, 6 Drawing Sheets

DEVICE FOR ACTIVATING PERSONAL PROTECTION MEANS

FIELD OF THE INVENTION

The present invention is directed to a device for activating a personal protection device.

BACKGROUND INFORMATION

German Patent Application No. DE 100 33 907 A1 describes a device for activating a personal protection device, in which the crash severity, for example, determined by a frontal sensor, is used for activating the personal protection means.

SUMMARY

A device according to an example embodiment of the present invention for activating a personal protection device may have the advantage over the related art that the delay between a first signal from an impact sensor system situated in the front of the vehicle, which identifies an impact, and a second signal from an acceleration sensor system located centrally in the vehicle, which also indicates the impact is determined. This delay provides information not only about the crash sequence, but also about the crash partner. A parameter which serves for improved activation of the personal protection devices such as airbags, belt tensioners, rollover bars, or pedestrian protection devices is thus available.

It may be particularly advantageous if the device determines a crash severity as a function of the delay and activates the personal protection device as a function of the crash severity. The acceleration sensor installed centrally in the vehicle, typically on the transmission tunnel, does not see the direct impact with the object. Several milliseconds elapse until an acceleration signal is detected. This time delay is a function of the crash configuration, i.e., the impact velocity and the relationship between the rigidities and masses of the accident partners. Determining this delay between impact and reaching a start threshold, i.e., the noise threshold and the analysis of the impact pulse following the start threshold, allows accurate conclusions to be drawn about the crash severity.

The first and second signals are generated by the noise thresholds being exceeded due to an impact. The impact sensor system may be contact switches in particular. They are closed by the effect of the impact.

It may be advantageous if the device starts a deployment algorithm as a function of the signal of the impact sensor system. The deployment algorithm is synchronized to the actual time of impact. Synchronization to the actual impact allows simple differentiation of soft barriers, in particular in the lower velocity range.

It may also be particularly advantageous if the device determines a size of an impact object as a function of the delay and influences the deployment algorithm as a function of the size. This is possible in particular in the case of pole crashes. First of all, the deployment sensitivity, i.e., a change in the noise threshold, may thus be achieved. There are only slight decelerations after the impact pulse due to the penetration of the pole into the soft vehicle structures. This does not change until after a later point in time, when the pole encounters massive structures such as the engine block, for example, causing the vehicle to decelerate. Identification of the object results in adjustment of the deployment threshold.

It may also be advantageous if the device according to the example embodiment of the present invention issues an estimate of the site of impact on the basis of the delay, the site of impact being taken into account in activating the personal protection means.

The impact sensor system may advantageously have a contact sensor system such as a force switch and/or an acceleration sensor system. These sensors my be situated directly on the bumper; however, they may also be situated in the extended vehicle front area such as on the front hood.

Finally, it may also be advantageous if the impact sensor system is distributed on the vehicle front to better detect the site of impact.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

By law, pedestrian protection must be introduced in vehicles within the European Union starting in 2005. In addition to initial passive approaches such as appropriate design of the vehicle front, active protective measures will be introduced in later stages. These protective measures include airbags in the area of the front hood and impact sensors whose signals cause these airbags to be activated. Impact sensors may include pre-impact sensors such as radar, ultrasound, and/or contact sensors. The contact sensors indicate the direct object impact and, depending on the measurement principle, may contribute to the classification of the impact object. Furthermore, the activation of airbags for occupant protection should be even better adjusted to the situation. For this purpose, further information is required.

According to an example embodiment of the present invention, a delay between a signal of a contact sensor and that of a centrally located acceleration sensor is used for improving the activation of the personal protection device. The contact sensor detects an impact at an early stage, while the acceleration sensor system, due to its central position on the transmission tunnel usually in the airbag control unit, does not detect it before a few milliseconds have elapsed. The delay may contribute valuable information for determining the crash severity and crash type, for estimating the size of the impact object, and estimating the site of impact.

Figure 1:
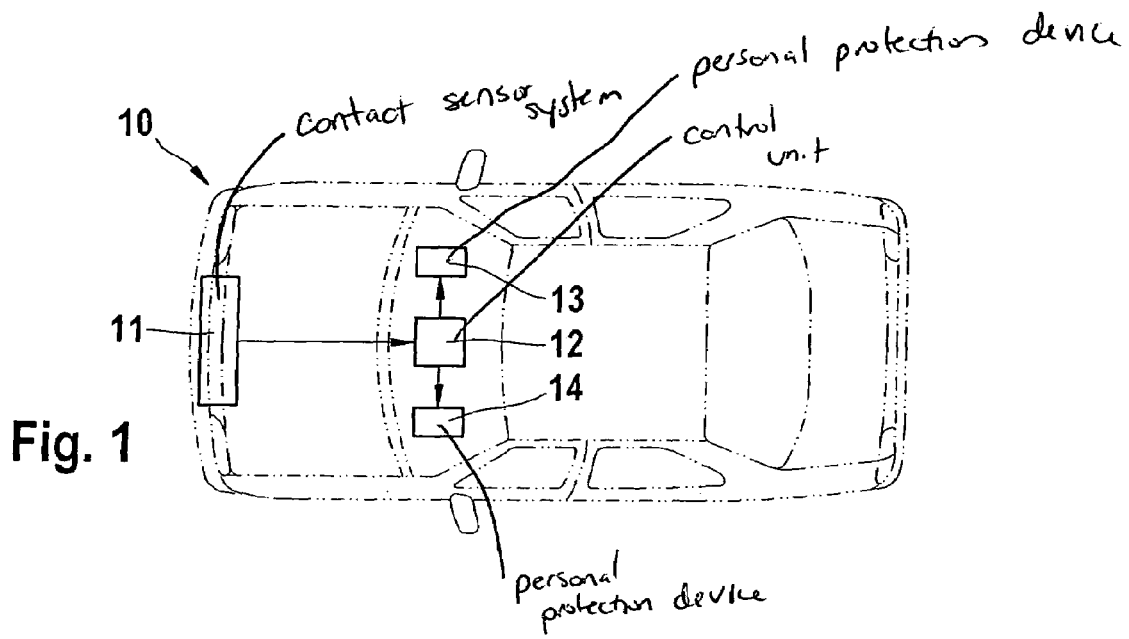
FIG. 1 shows a block diagram of a device according to an example embodiment of the present invention.

FIG. 1 shows a device according to the example embodiment of the present invention in a first block diagram. A contact sensor system 11 is situated in a vehicle 10 in the vehicle front area. The contact sensor system may be situated in the bumper in particular. It includes one or more switches or also acceleration sensors. A signal line connects contact sensor system 11 to a centrally situated control unit 12 for activating personal protection means. For example, control unit 12 is connected to personal protection means 13 and 14, which are to represent airbags here, via data outputs. Control unit 12 is normally connected to a much larger number of personal protection devices; however, only two are illustrated here as an example. In addition to a processor, normally a microcontroller, for activating personal protection devices 13 and 14 and for analyzing the signals of contact sensor system 11, an acceleration sensor system, which is sensitive at least in the longitudinal direction of the vehicle, is also located in control unit 12. The signals of this acceleration sensor system are also analyzed by the processor of control unit 12. Control unit 12 then activates personal protection devices 13 and 14 as a function of these signals.

According to the example embodiment of the present invention, control unit 12 determines a delay between the signals of contact sensor system 11 and its own acceleration sensor system 12. Contact sensor system 11, whose signal is transmitted over the signal line to control unit 12 almost without delay, detects an impact, for example, on the front of the vehicle, considerably earlier than centrally situated control unit 12 via its acceleration sensor. The crash severity may be determined, the deployment algorithm in control unit 12 may be started in a timely manner, and the size of the impact object and the site of impact may be estimated on the basis of this delay. Contact sensor system 11 may be supplemented by additional sensors such as acceleration sensors and pre-crash sensors. Additional sensors such as an occupant sensor system and other acceleration and/or pressure sensors are connected to control unit 12, but are not illustrated here for the sake of simplicity.

Figure 2:
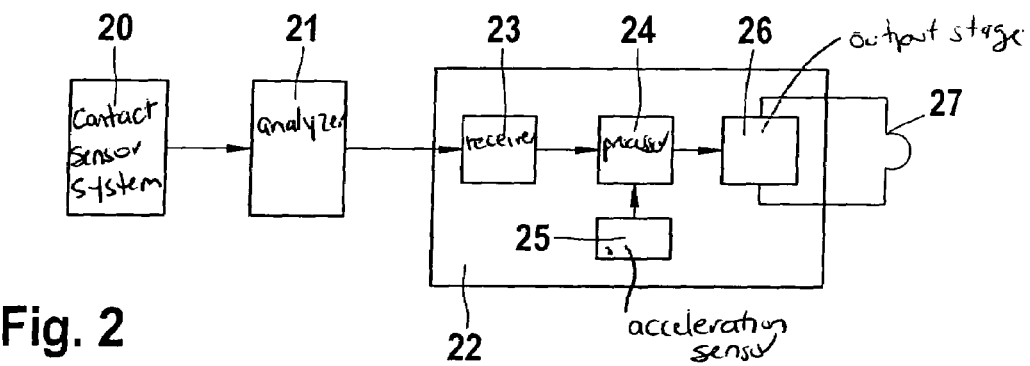
FIG. 2 shows another block diagram of the device according to an example embodiment of the present invention.

FIG. 2 shows another block diagram of the device according to the example embodiment of the present invention. Contact sensor system 20 is connected to an analyzer module 21, which processes the signal of contact sensor system 20 and transmits it via the signal line to control unit 22. Control unit 22 has a receiver module 23, which receives the signal from module 21 and transmits it to a processor 24 in control unit 22. Processor 24 also takes into account signals from acceleration sensor system 25 located in control unit 22. This acceleration sensor system 25 detects at least the acceleration in the longitudinal direction of the vehicle. Processor 24 activates output stages 26, which are connected to an ignition circuit 27 for example, as a function of these acceleration signals and the signal from contact sensor system 20. In particular, processor 24 starts its deployment algorithm as a function of a signal from contact sensor system 20. Processor 24 determines, from the delay between the signal from contact sensor system 20 and acceleration sensor system 25, the crash severity, a size of the impact object, and the site of impact, in order to determine therefrom which personal protection devices are to be activated and how.

Figure 3:
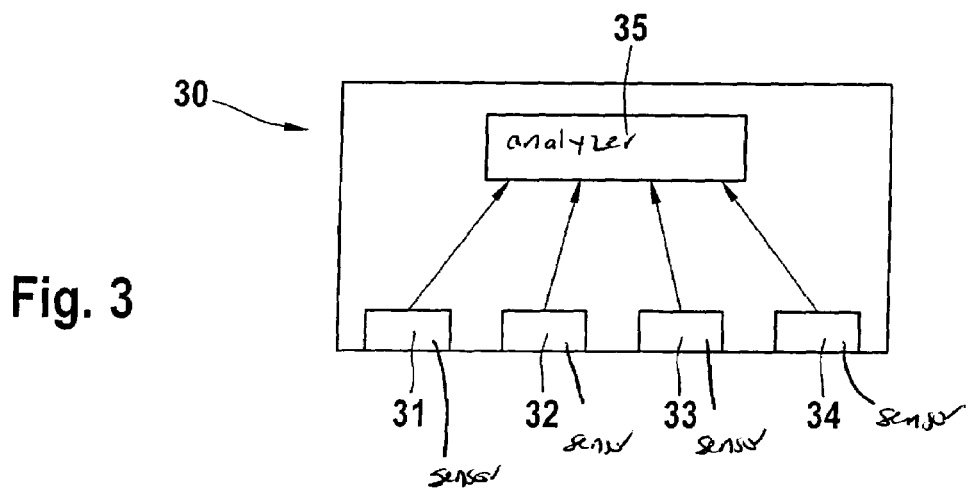
FIG. 3 shows another block diagram of the device according to an example embodiment of the present invention.

FIG. 3 shows a special configuration of the contact sensor system. In front 30 of the vehicle, different sensors 30, 32, 33, and 34, normally switches, are distributed over the length of the vehicle front. These switches are connected to an analyzer module 35, which processes these signals for transmission to control unit 22. This configuration allows a site of impact to be easily identified. The impact sensors on the vehicle front may also be arranged vertically above one another. A field of such impact sensors may thus also be provided on the front of the vehicle.

Figure 4:
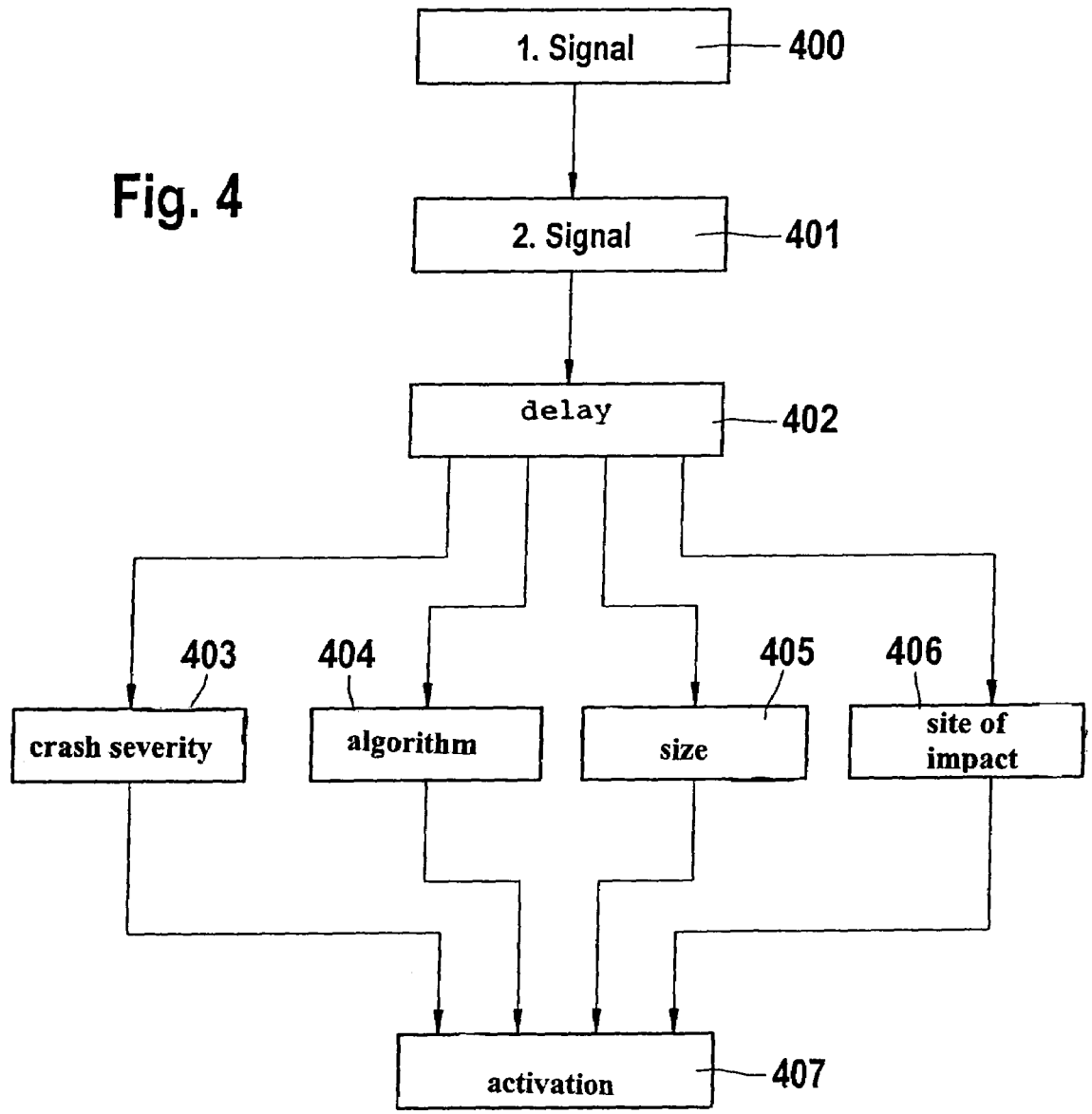
FIG. 4 shows a flow chart.

FIG. 4 explains, using a flow chart, the sequence executed by the device according to the example embodiment of the present invention. In method step 400, the signal is generated by contact sensor system 20 and transmitted, via modules 21 and 23, to processor 24 of control unit 22. In method step 401, the second signal is generated by acceleration sensor system 25. There is a delay between these two signals, which is determined in method step 402. On the basis of the delay, processor 24 determines the crash severity; in step 403 it starts algorithm 404 as a function of the first signal and determines the size of the opposite party of the accident in method step 405. In addition, the impact point may be determined, on the basis of the delay and other signals, in step 406. Restraining devices 27 are then activated on the basis of this information in step 407.

Figure 5:
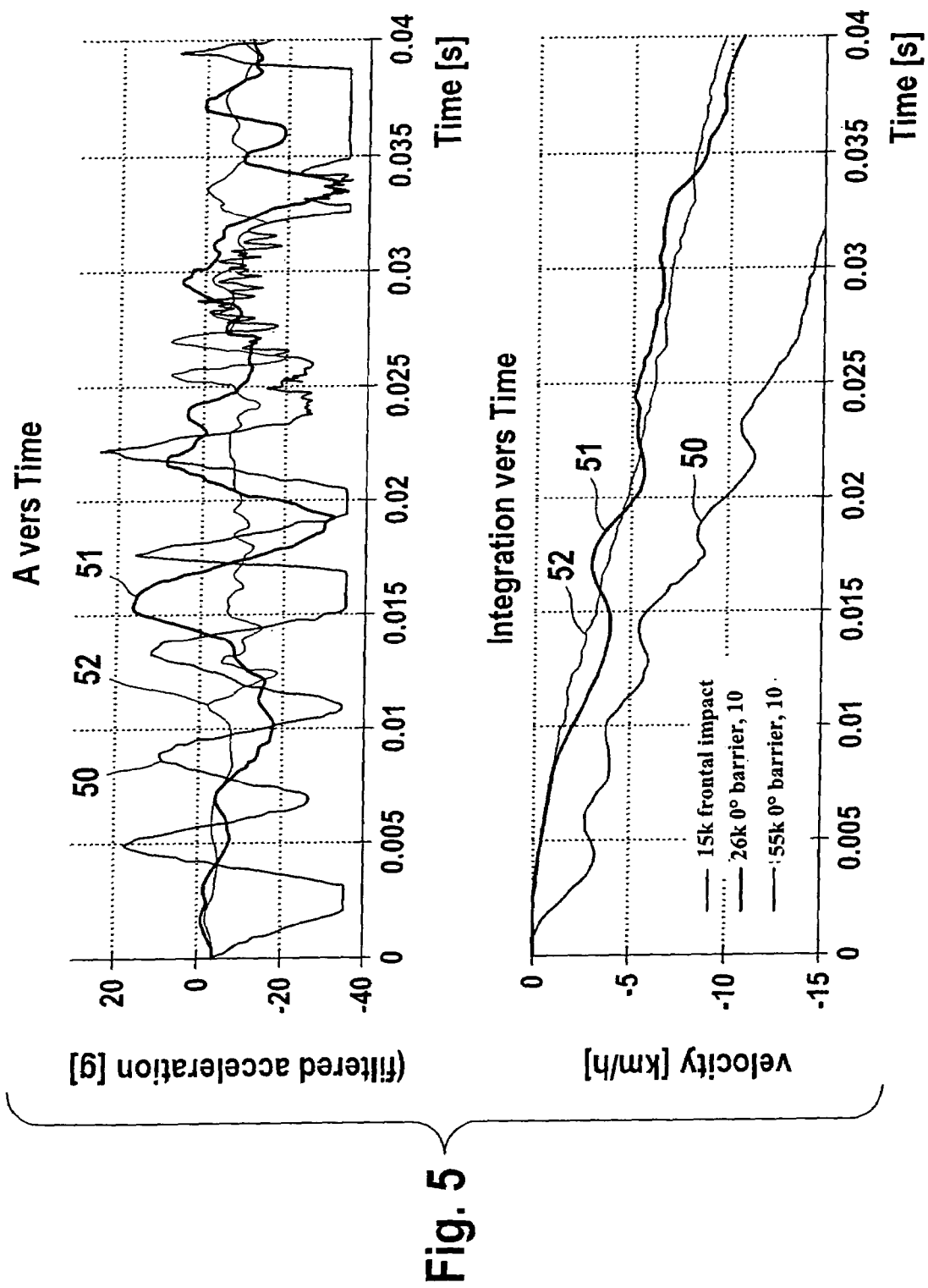
FIG. 5 shows a signal comparison including the influence of the noise threshold.

The upper diagram of FIG. 5 shows accelerations for a frontal impact and for impacts against a soft and a hard barrier. The lower diagram of FIG. 5 shows the corresponding decrease in velocity. Synchronization to the actual impact allows simple differentiation of soft barriers, in particular in the lower velocity range. The airbag control unit continuously monitors the signals of sensor 25. If these signals exceed a first threshold (hereinafter noise threshold), the processor starts analyzing the signals. This threshold may be established in different ways: as a simple threshold or, for example, by comparison of two window integrals having different lengths, which differ from one another in the event of a crash. The only important thing here is the determination of the start point via the acceleration signals. The signals experience a certain delay due to the structure, because they usually travel from the bumper via the longitudinal structure to the sensor in the airbag control unit. This delay is also a function of the impact velocity and the hardness of the barrier. FIG. 5 shows three different configurations.

Signal 50: 55 km/h against a rigid barrier

Signal 51: 26 km/h against a rigid barrier

Signal 52: 15 km/h against a rigid barrier

These three different impact velocities are plotted in the graph of acceleration and the resulting integrated change in velocity. The similarities between the integral curves of signals 51 and 52 are readily apparent. This results in considerable complexity in differentiating these two different crashes, because signal 52 is to be classified as a non-deployer.

Figure 6:
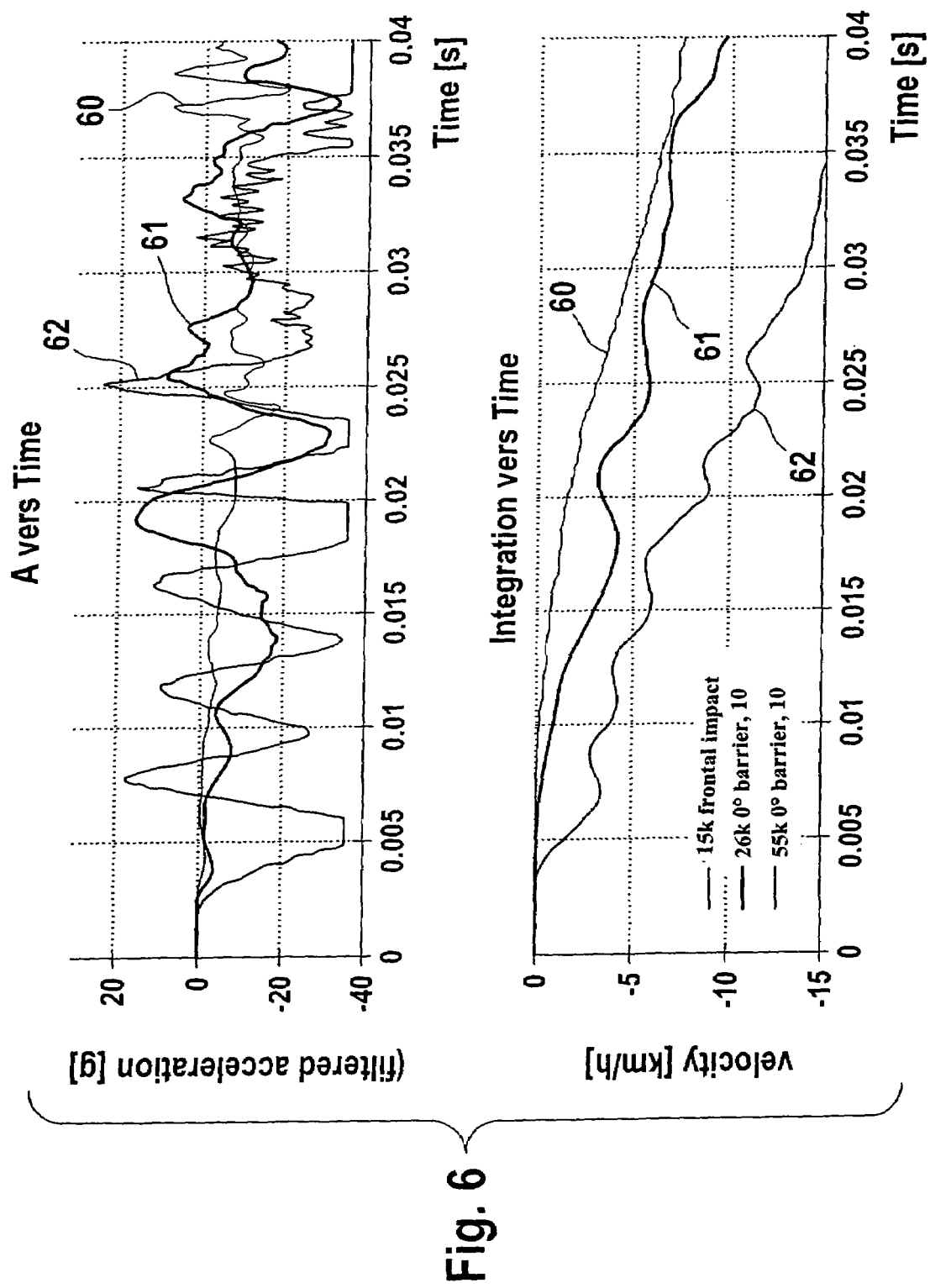
FIG. 6 shows a signal comparison without the influence of the noise threshold.

In FIG. 6, the same signals are plotted again, however, with synchronization from impact start. This is provided by impact sensor 11. The signals now are:

Signal 60: 55 km/h against a rigid barrier

Signal 61: 26 km/h against a rigid barrier

Signal 62: 15 km/h against a rigid barrier

In the lower figure the three different signals are easily differentiated visually. This is achieved via the information of impact sensor 11.

Figure 7:
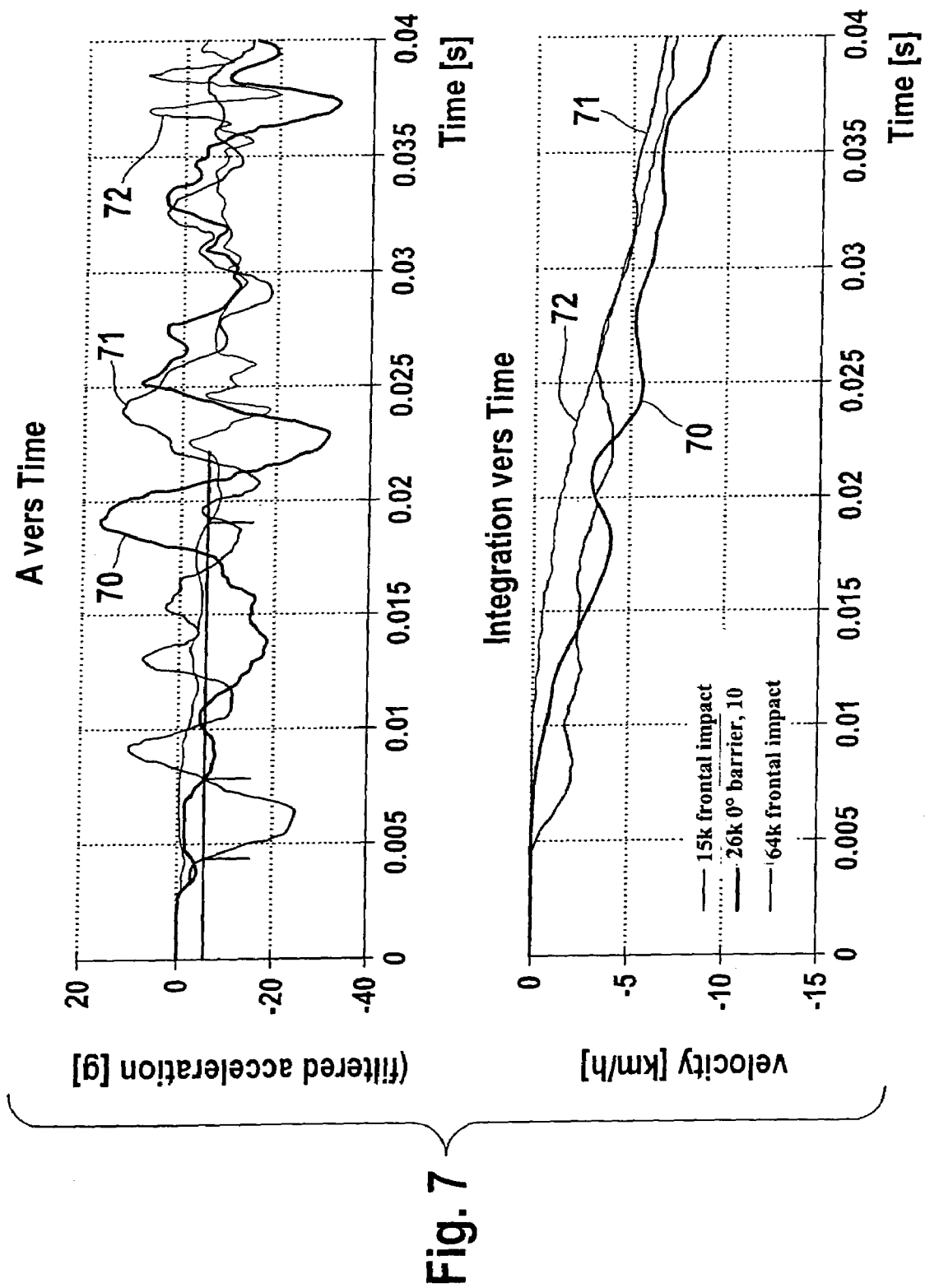
FIG. 7 shows an effect of the start threshold.

FIG. 7 shows the effect of a start threshold. Determining this delay between impact and reaching a start threshold and the analysis of the impact pulse following the start threshold allows accurate conclusions to be drawn about the crash severity.

FIG. 7 shows that the impact pulse of the 64 km/h impact against a deformable barrier differs from the 26 km/h crash against a rigid barrier. However, in examining the decreased velocity, the 26 km/h crash appears as a stronger signal even after a short time. The 26 km/h crash is shown by curve 70 in the acceleration-time diagram and the velocity decrease-time diagram, while the 64 km/h crash is shown by curve 71.

Furthermore, FIG. 7 shows vertical lines (4.5 ms, 8 ms, 19 ms); these marks are reached by the corresponding signals (71, 70, 72) via the threshold shown (~3 g). The time marks indicate the delay due to the structure and are roughly inversely proportional to the impact velocity (indicator only).

Furthermore, the acceleration curve following the mark (first peak) may be analyzed and information regarding the barrier hardness may be obtained. It is readily apparent that curve 71 produces a pronounced peak, which occurs earlier and has a considerably different shape from that of signal 70. Curve 72 is plotted as a reference. Similar information may also be derived from FIG. 8.

Figure 8:
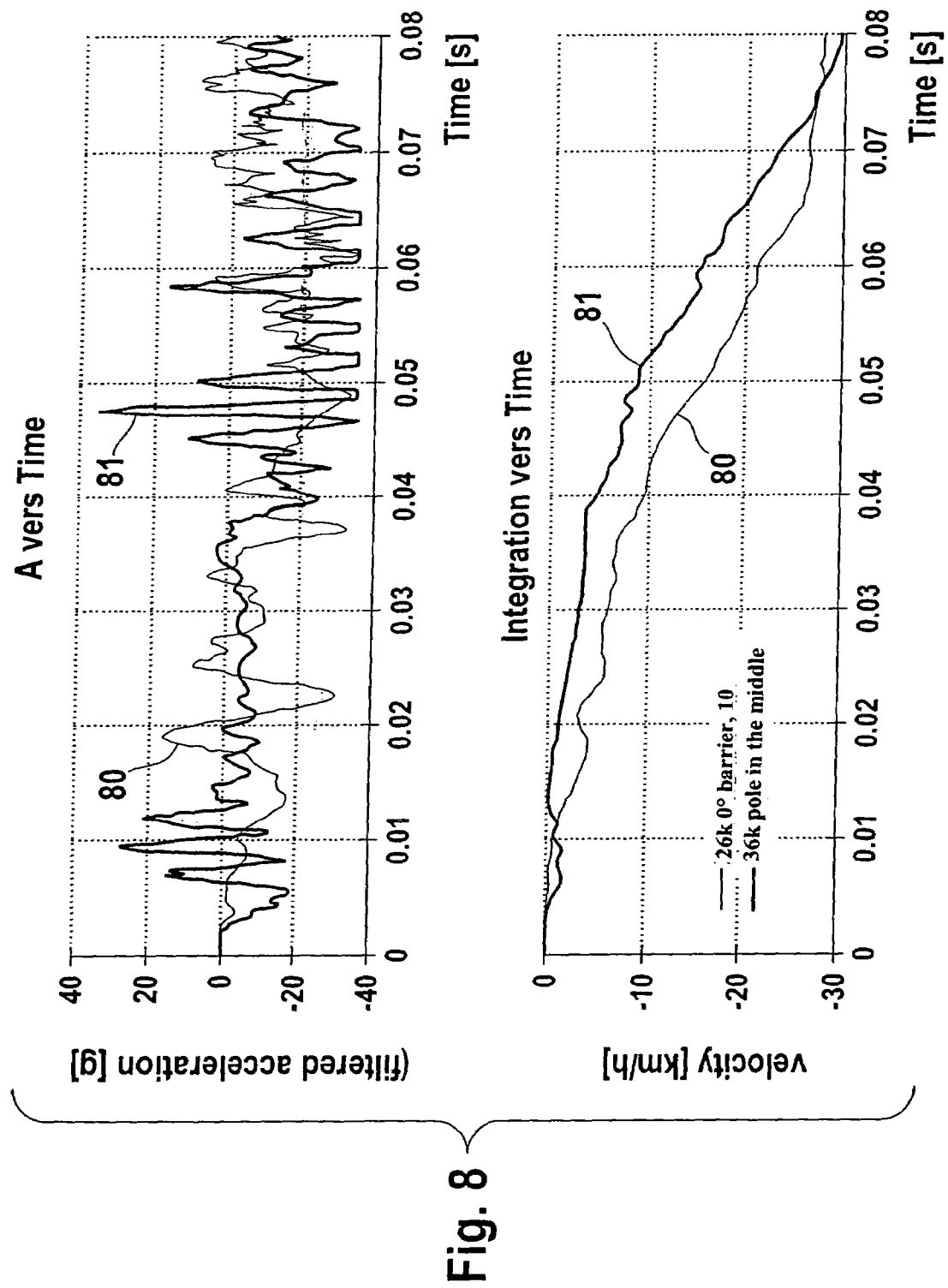
FIG. 8 shows a pole crash.

FIG. 8 shows the effect of a pole crash via an acceleration-time diagram and a velocity decrease-time diagram. If the size of an impact object is detectable, this may be used for changing the deployment sensibility in the event of pole crashes. There are only slight decelerations after the impact pulse due to the penetration of the pole into the soft vehicle structures. This does not change until after the 40 ms time mark, as shown by curve 81, when the pole encounters massive structures such as the engine block, for example, causing the vehicle to decelerate. An identification of the object, the size of the impact, and the crash sequence may adjust the deployment threshold in this case.

What is claimed is:

1. A device for activating a personal protection device, comprising:
    an arrangement configured to activate the personal protection device as a function of a delay between a first signal from an impact sensor system situated in a front of a vehicle and a second signal from a centrally located acceleration sensor system, the first and second signals each identifying an impact.

2. The device as recited in claim 1, wherein the arrangement is configured to determine a crash severity as a function of a delay and to activate the personal protection device as a function of the crash severity.

3. The device as recited in claim 1, wherein the arrangement initiates a deployment algorithm as a function of the first signal.

4. The device as recited in claim 3, wherein the arrangement is configured to determine a size of an impact object as a function of the delay and influences the deployment algorithm as a function of the size.

5. The device as recited in claim 1, wherein the arrangement takes the delay into account in determining a site of impact.

6. The device as recited in claim 1, wherein the impact sensor system includes at least one of a contact sensor system, an acceleration sensor system, and an environment sensor system.

7. The device as recited in claim 1, wherein the impact sensor system is distributed on a front of the vehicle.

8. The device as recited in claim 1, wherein:
    the arrangement is configured to determine a crash severity as a function of a delay and to activate the personal protection device as a function of the crash severity,
    the arrangement initiates a deployment algorithm as a function of the first signal, and
    the arrangement is configured to determine a size of an impact object as a function of the delay and influences the deployment algorithm as a function of the size.

9. The device as recited in claim 1, wherein:
    the arrangement takes the delay into account in determining a site of impact,
    the impact sensor system includes at least one of a contact sensor system, an acceleration sensor system, and an environment sensor system, and
    the impact sensor system is distributed on a front of the vehicle.

10. The device as recited in claim 1, wherein:
    the arrangement is configured to determine a crash severity as a function of a delay and to activate the personal protection device as a function of the crash severity,
    the arrangement initiates a deployment algorithm as a function of the first signal,
    the arrangement is configured to determine a size of an impact object as a function of the delay and influences the deployment algorithm as a function of the size,
    the arrangement takes the delay into account in determining a site of impact,
    the impact sensor system includes at least one of a contact sensor system, an acceleration sensor system, and an environment sensor system, and
    the impact sensor system is distributed on a front of the vehicle.

\* \* \* \* \*

UNITED STATES PATENT AND TRADEMARK OFFICE
CERTIFICATE OF CORRECTION

PATENT NO. : 7,584,036 B2
APPLICATION NO. : 10/582181
DATED : September 1, 2009
INVENTOR(S) : Michael Roelleke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Fourteenth Day of September, 2010

David J. Kappos
*Director of the United States Patent and Trademark Office*